(12) United States Patent
Okumura et al.

(10) Patent No.: US 8,111,349 B2
(45) Date of Patent: Feb. 7, 2012

(54) IMAGE DISPLAY DEVICE

(75) Inventors: Tsuyoshi Okumura, Osaka (JP); Eisuke Kamiesu, Osaka (JP)

(73) Assignee: Sanyo Electric Co., Ltd, Moriguchi-shi (JP)

( * ) Notice: Subject to any disclaimer, the term of this patent is extended or adjusted under 35 U.S.C. 154(b) by 0 days.

(21) Appl. No.: 12/782,071

(22) Filed: May 18, 2010

(65) Prior Publication Data

US 2010/0225847 A1  Sep. 9, 2010

Related U.S. Application Data (63) Continuation of application No. 12/164,644, filed on Jun. 30, 2008, now Pat. No. 7,830,471.

(30) Foreign Application Priority Data

Jun. 29, 2007  (JP) ................................. 2007-172237

(51) Int. Cl.
*G02F 1/1333* (2006.01)

(52) U.S. Cl. ........................................................ 349/60
(58) Field of Classification Search ............... 349/58–60
See application file for complete search history.

(56) References Cited

U.S. PATENT DOCUMENTS

2006/0290835 A1* 12/2006 Sakuma .......................... 349/58
2007/0052100 A1   3/2007 Bellinger

FOREIGN PATENT DOCUMENTS

JP   2004-317919 A   11/2004
* cited by examiner

*Primary Examiner* — Eric Wong
(74) *Attorney, Agent, or Firm* — Westerman, Hattori, Daniels & Adrian, LLP (57) ABSTRACT

An image display device of the present invention includes a liquid crystal display panel, a resin frame for attaching the liquid crystal display panel to a front cabinet and a circuit board that are arranged inside a casing. The resin frame is provided with a grounding clamp arranged between the circuit board and the liquid crystal display panel. The grounding clamp establishes electrical connection between a ground pattern formed on the circuit board and a metal plate arranged on the rear surface of the liquid crystal display panel.

3 Claims, 9 Drawing Sheets

IMAGE DISPLAY DEVICE

CROSS-REFERENCE TO RELATED APPLICATIONS

This application is a continuation of U.S. Application No. 12/164,644, filed on Jun. 30, 2008 which is based upon and claims the benefit of priority from the prior Japanese Patent Application No. 2007-172237, filed on Jun. 29, 2007, the entire contents of which are incorporated herein by reference.

FIELD OF THE INVENTION

The present invention relates to an image display device provided with a flat display panel such as a liquid crystal display panel or a plasma display panel.

BACKGROUND OF THE INVENTION

A flat image display device of this type includes a flat display panel housed in a thin casing. A circuit board for driving the flat display panel is arranged on the side of the rear surface of the flat display panel (see Japanese Patent Application Laid-Open No. 2004-317919).

Figure 10:
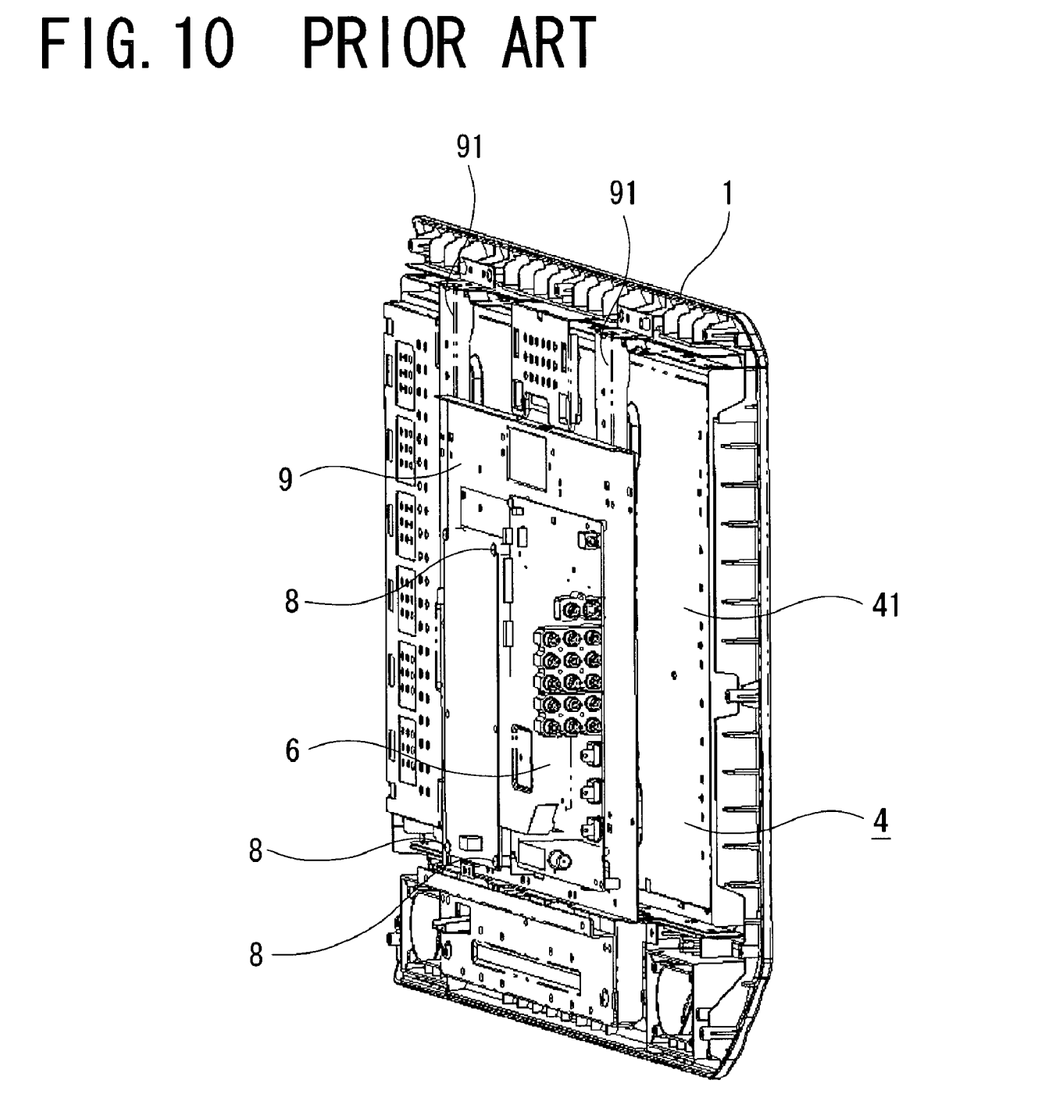
FIG. 10 is a perspective view showing a state where a liquid crystal display panel and a circuit board are attached to a front cabinet in a conventional liquid crystal display television receiver.
Figure 11:
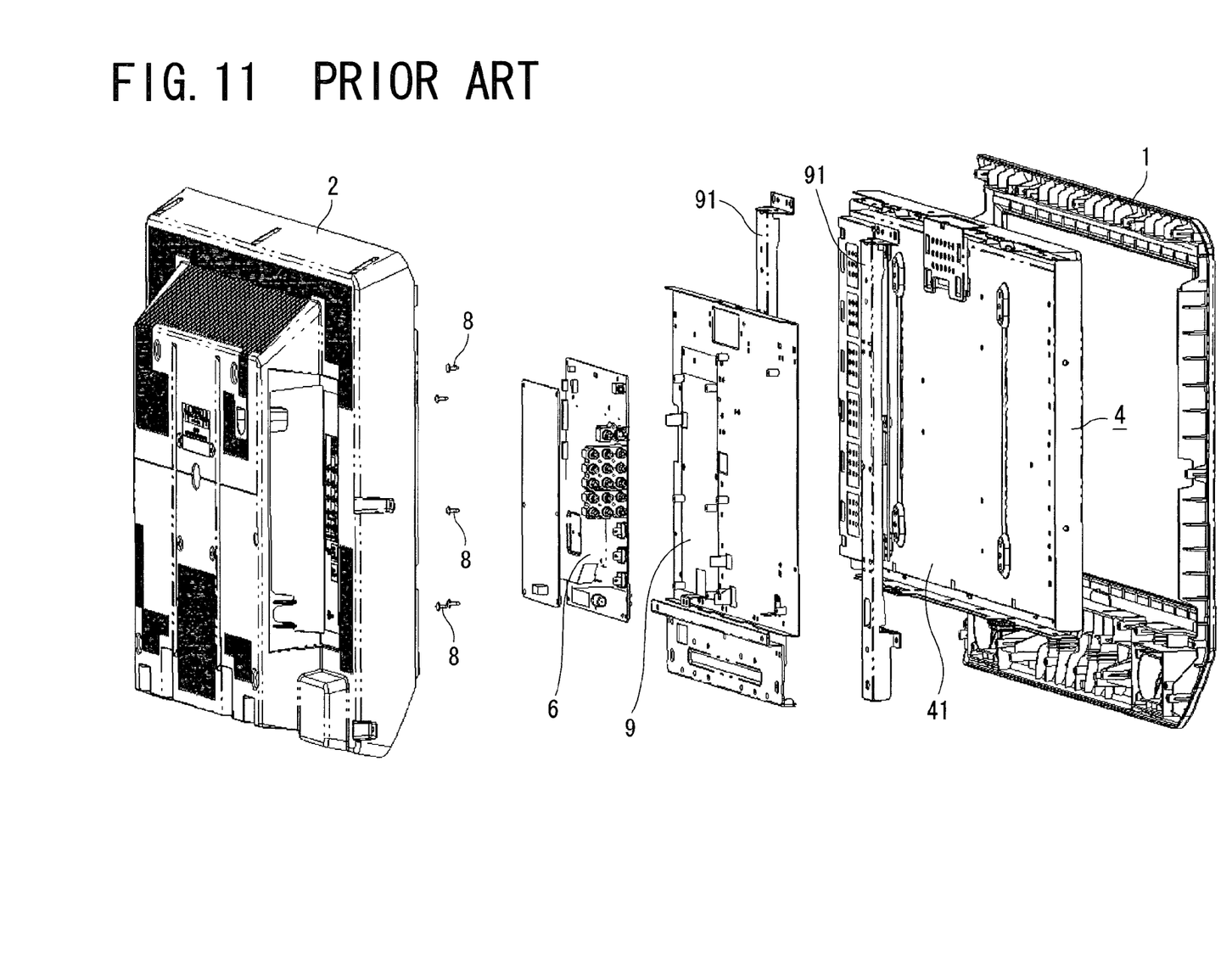
FIG. 11 is an exploded perspective view of the conventional liquid crystal display television receiver.

As an example, in a television receiver with a liquid crystal display (LCD), a liquid crystal display panel 4 and a circuit board 6 are arranged between a front cabinet 1 and a back cabinet 2 as shown in FIG. 11. The circuit board 6 is provided with a television broadcast receiver circuit and the like mounted thereon for causing an image to be displayed on the liquid crystal display panel 4. As shown in FIG. 10, the liquid crystal display panel 4 is attached to the front cabinet 1 by using two metal arms 91, 91. The circuit board 6 is fixedly attached by using a plurality of screws 8 to the rear surface of a metal frame 9 fixed to the two metal arms 91, 91.

In this television receiver, a ground pattern (not shown) on the circuit board 6 is connected to the metal frame 9, and the metal frame 9 is connected to a metal plate 41 arranged on the rear surface of the liquid crystal display panel 4. This establishes electrical connection of the ground pattern on the circuit board 6 with the metal plate 41 of the liquid crystal display panel 4 whereby the ground pattern on the circuit board 6 contacts a ground potential area constituted by the metal plate 41. As a result, electromagnetic compatibility (EMC) is maintained.

The conventionally employed television receiver shown in FIGS. 10 and 11 uses the metal frame 9 and the two metal arms 91, 91, resulting in the increase in weight and in number of parts. Further, the removal of burrs generated in the process of forming the metal frame 9 results in cost increase. To solve these problems, the metal frame 9 may be replaced by a resin frame, however, this causes difficulty in maintaining EMC.

SUMMARY OF THE INVENTION

It is therefore an object of the present invention to provide an image display device capable of maintaining EMC at a sufficient level with the use of a resin frame.

An image display device according to the present invention includes: a casing with a front cabinet and a back cabinet; a flat display panel; a frame for attaching the flat display panel to the front cabinet; and a circuit board provided with an electronic circuit mounted thereon that causes an image to be displayed on the flat display panel. The flat display panel, the frame and the circuit board are arranged inside the casing.

The frame is a resin molded article. This resin frame is provided with a grounding clamp attached thereto and arranged between the circuit board and the flat display panel. The grounding clamp establishes electrical connection between a ground pattern formed on the circuit board and a metal plate arranged on the rear surface of the flat display panel.

In the image display device of the present invention, the ground pattern on the circuit board is connected through the grounding clamp to the metal plate arranged on the rear surface of the flat display panel to establish electrical connection between the ground pattern on the circuit board and the metal plate of the flat display panel. The ground pattern on the circuit board is thereby grounded to maintain EMC.

A particular configuration is such that the grounding clamp has an elastic section projecting toward the rear surface of the flat display panel, and the elastic section is pressed against the metal plate of the flat display panel by its elastic resilience. According to this particular configuration, since the elastic section of the grounding clamp is pressed by its elastic resilience against the metal plate of the flat display panel, electrical connection is reliably established between the grounding clamp and the metal plate of the flat display panel.

Another particular configuration is such that the resin frame has a rear surface provided with a plurality of bosses sticking out for the placement of the circuit board. A plurality of screws penetrate through the circuit board to be engaged with the plurality of bosses respectively. The grounding clamp is attached to at least one of the plurality of bosses. According to this particular configuration, the bosses for the placement of the circuit board are employed for the placement of the grounding clamp. This means no specific structure is required for the placement of the grounding clamp.

Still another particular configuration is such that the grounding clamp is a sheet metal, having: a top plate section arranged on a surface of one boss of the resin frame and fixed by a screw to the boss; a strip section extending from an end portion of the top plate section along the boss to a position at the same level as the front surface of the resin frame; a seat plate section projecting from an end portion of the strip section and being in contact with the front surface of the resin frame; and a spring plate section projecting from the seat plate section and serving as the elastic section. According to this particular configuration, the grounding clamp can be formed by performing sheet metal working upon a sheet-shaped metal plate. This realizes reduction in manufacturing costs.

Yet another particular configuration is such that the spring plate section of the grounding clamp is bent into a U-shape, extending from one edge to the opposite edge of the seat plate section. Further, the U-shape defined by the spring plate section of the grounding clamp is skewed to either side with respect to a normal to the seat plate section. According to this particular configuration, in the assembly process of the image display device, the spring plate section of the grounding clamp is pressed against the metal plate of the flat display panel. The spring plate section is thereby elastically deformed, by the elastic resilience of which the spring plate section comes into contact under pressure with the metal plate. In this process, as a result of the skewness of the U-shape of the spring plate section to either side, a contact area with the metal plate slidingly moves along a surface of the metal plate. This sliding movement of the spring plate section more reliably establishes electrical connection between the grounding clamp and the metal plate.

The grounding clamp also applies a load (pressure) to the flat display panel. A load to be applied should be of such a degree that electrical connection between the grounding clamp and the metal plate is reliably established as discussed above, whereas a load to be applied to the flat display panel should be controlled to an appropriate degree. This load of an appropriate degree is controlled within a range that does not generate unevenness of an image displayed on the flat display panel.

As discussed above, in the image display device of the present invention, the resin frame takes the place of a conventionally used metal frame. This realizes weight savings and reduction in manufacturing costs. Further, EMC is maintained at a sufficient level by a ground structure realized by the grounding clamp.

DETAILED DESCRIPTION OF THE EMBODIMENTS

Figure 1:
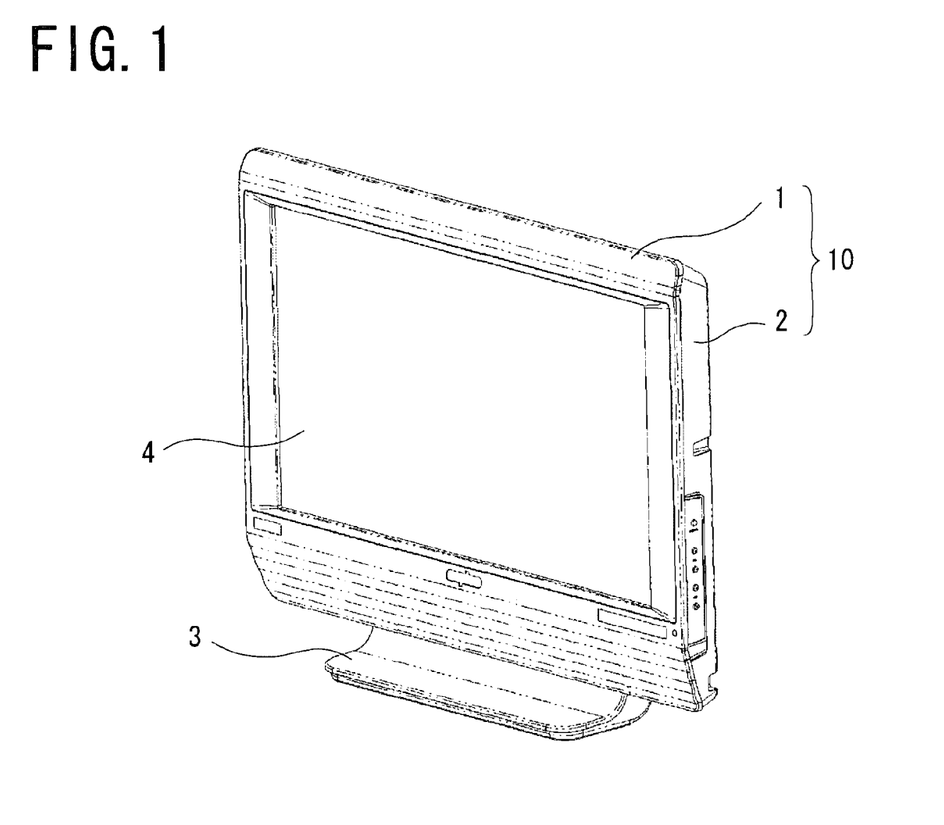
FIG. 1 is a perspective view of a liquid crystal display television receiver according to the present invention.

In a preferred embodiment discussed in detail below with reference to drawings, the present invention is implemented in a liquid crystal display television receiver. As shown in FIG. 1, the liquid crystal display television receiver according to the present invention includes a thin casing 10 formed from a front cabinet 1 and a back cabinet 2, and the casing 10 is capable of self-standing by means of a stand 3.

Figure 2:
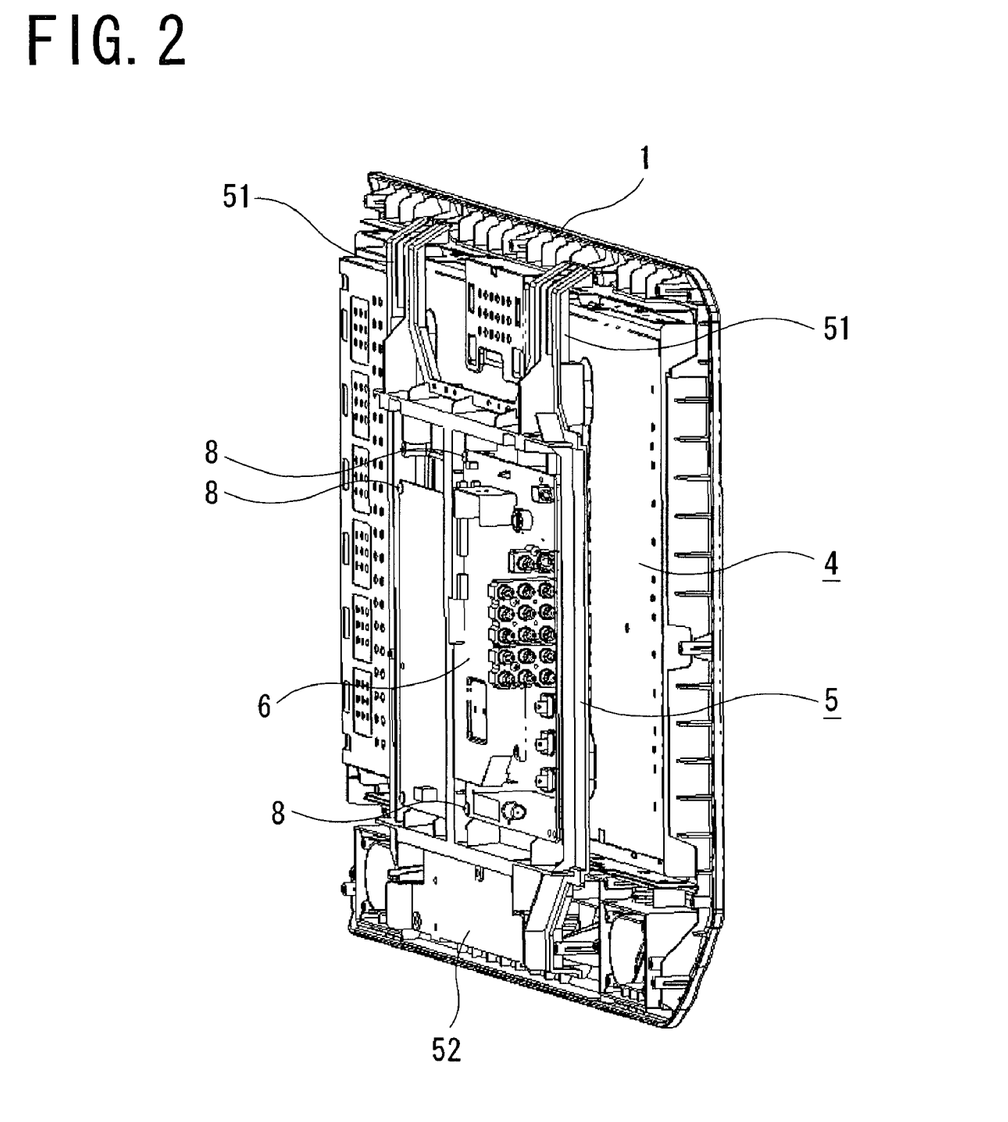
FIG. 2 is a perspective view showing a state where a liquid crystal display panel and a circuit board are attached to a front cabinet.

With reference to FIG. 2, a liquid crystal display panel 4 is arranged on the rear surface of the front cabinet 1. The liquid crystal display panel 4 is attached by a resin frame 5 to the front cabinet 1. A circuit board 6 provided with a television broadcast receiver circuit and a power circuit mounted thereon is attached by using a plurality of screws 8 to the rear surface of the resin frame 5.

Figure 3:
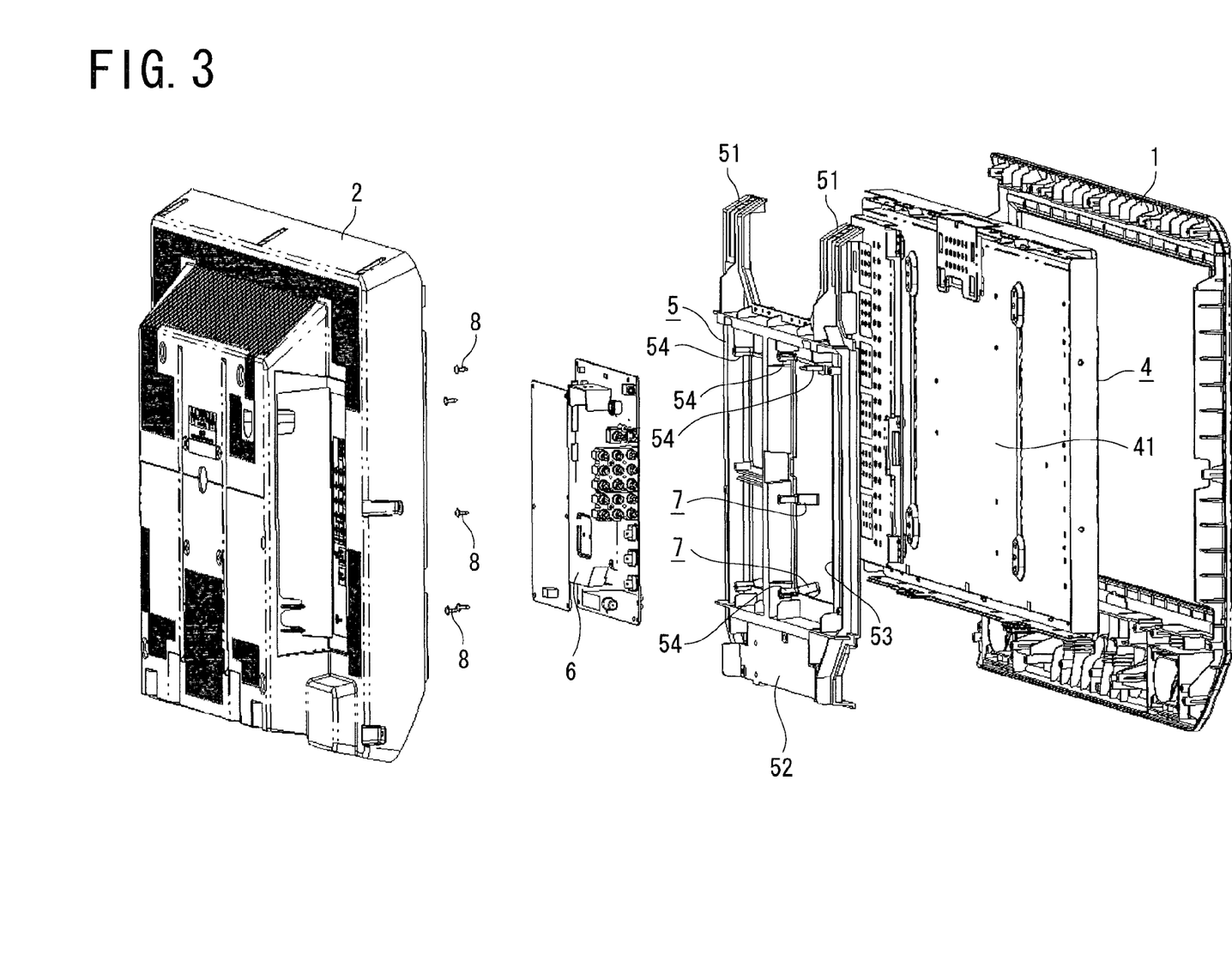
FIG. 3 is an exploded perspective view of the liquid crystal display television receiver.
Figure 5:
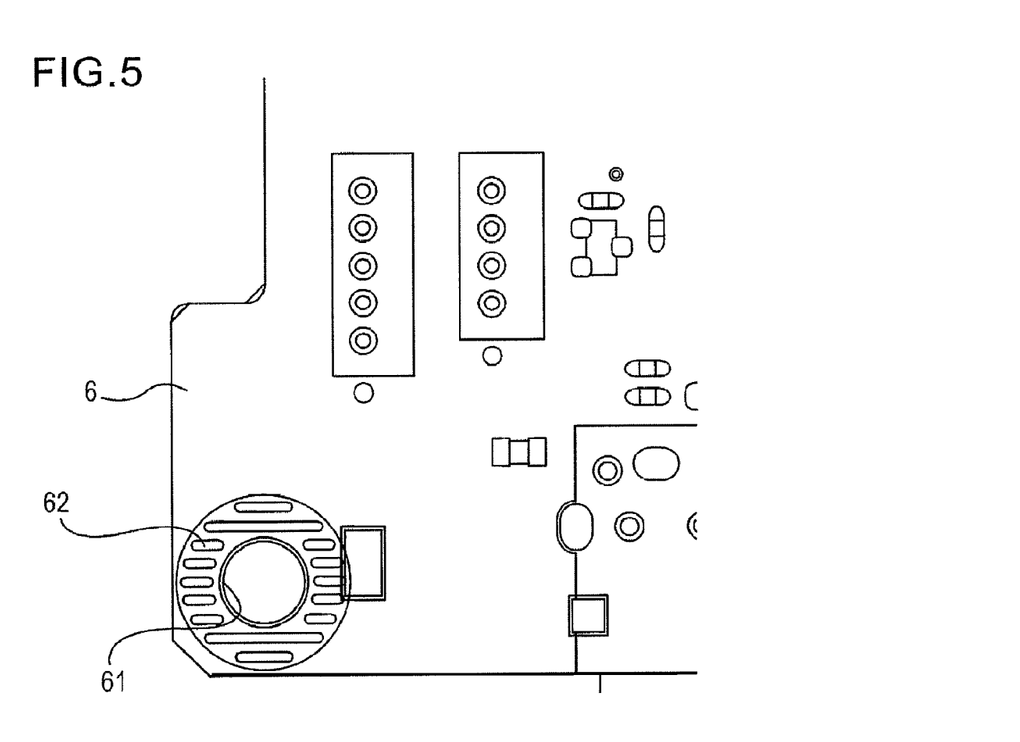
FIG. 5 is a front view showing a ground pattern formed on a circuit board.

As shown in FIG. 3, the liquid crystal display panel 4 has a rear surface covered with a metal plate 41 which serves to maintain the EMC of the liquid crystal display panel 4 per se. The resin frame 5 has a broad opening 53 at its central portion, and is formed into a frame as a whole. The resin frame 5 has two upwardly projecting fixtures 51, 51 in the form of arms at its upper end portion, and a downwardly projecting fixture 52 in the form of a plate at its lower end portion. The fixtures 51, 51, 52 are screw-threadedly engaged with the front cabinet 1 to thereby hold the liquid crystal display panel 4 between the front cabinet 1 and the resin frame 5. With reference to FIG. 5, the surface of the circuit board 6 on the side of the front cabinet 1 is provided with a ground pattern 62 formed thereon that surrounds a screw hole 61.

Figure 4:
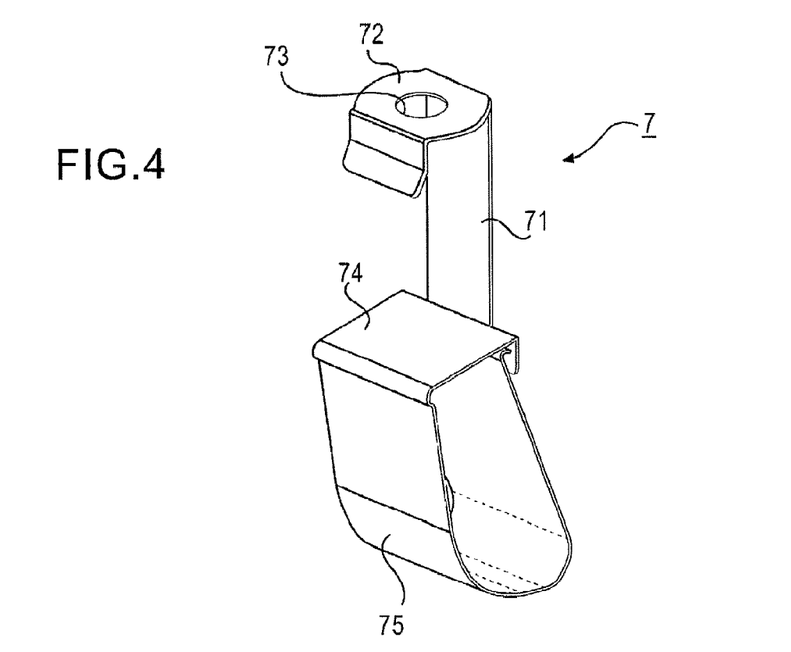
FIG. 4 is a perspective view of a grounding clamp in an enlarged manner.

The rear surface of the resin frame 5 is provided with a plurality of bosses 54 for supporting the circuit board 6 that are arranged along the inner periphery of the opening 53 while sticking out to the circuit board 6. A grounding clamp 7 shown in FIG. 4 is fitted to a corresponding one of two or more of the plurality of bosses 54 (In FIG. 3, two of the plurality of bosses).

Figure 6:
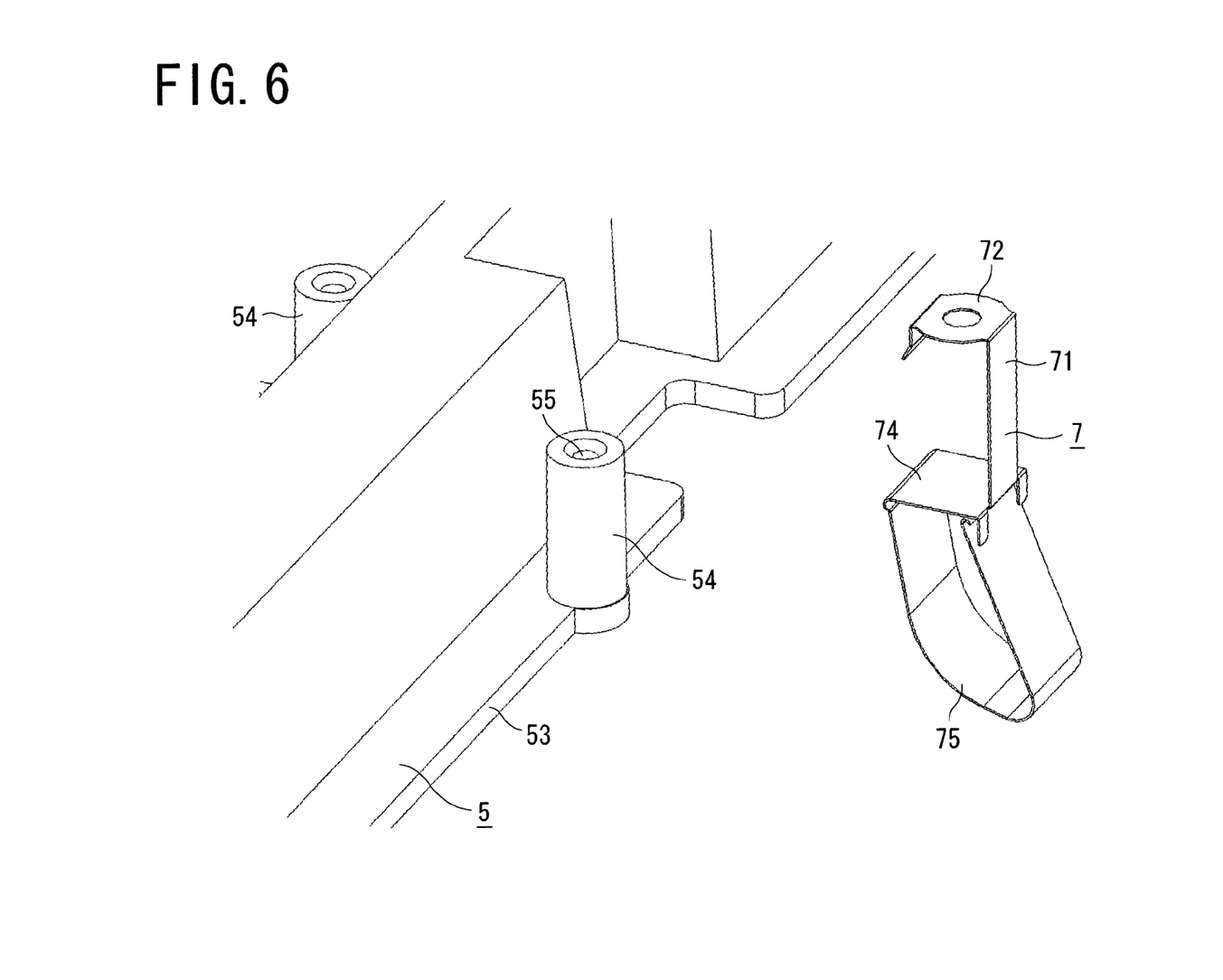
FIG. 6 is a perspective view showing a state where a resin frame and the grounding clamp are separated from each other.
Figure 7:
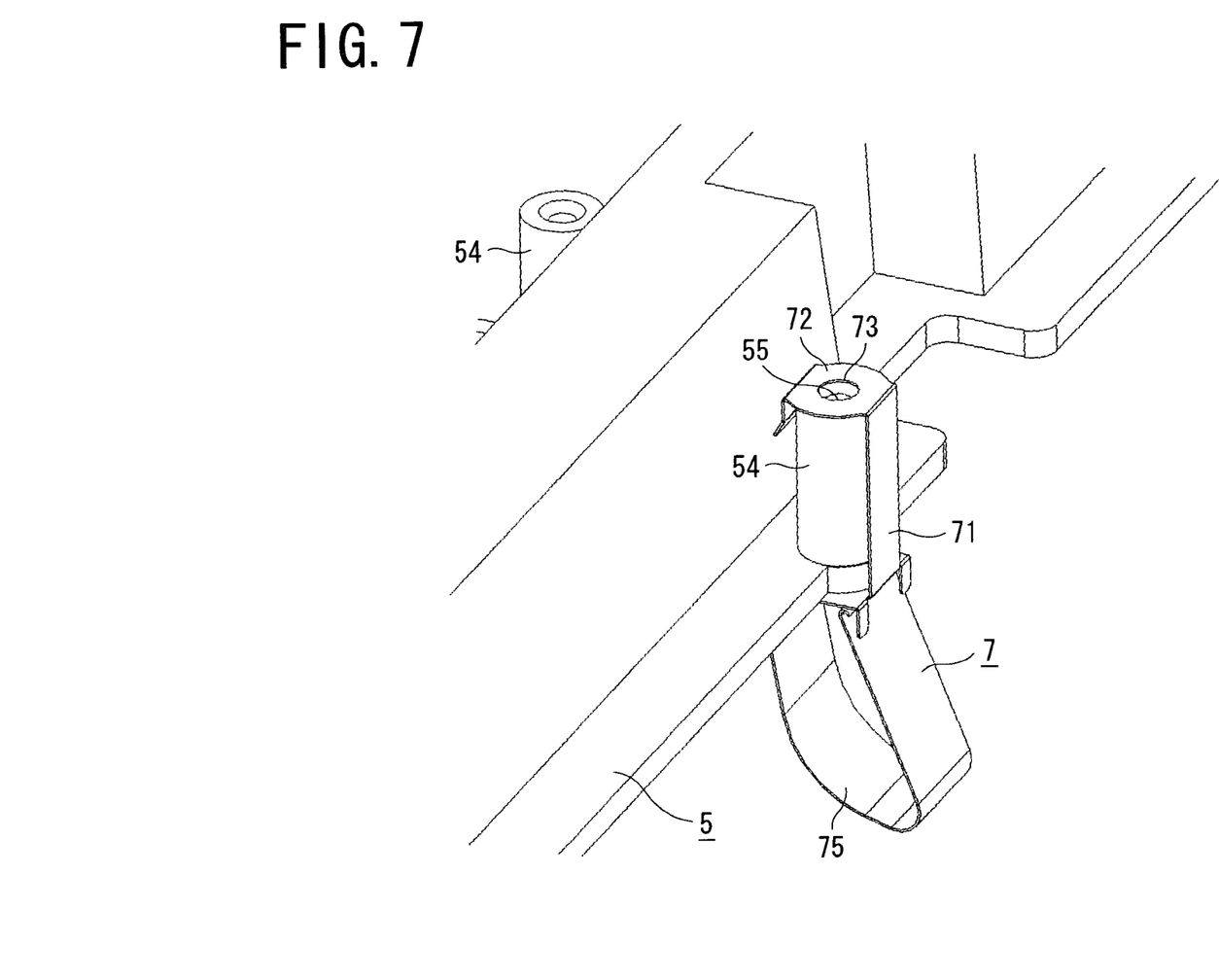
FIG. 7 is a perspective view showing a state where the resin frame and the grounding clamp are fitted together.

With reference to FIGS. 6 and 7, the grounding clamp 7 has: a top plate section 72 to be arranged on a surface of the boss 54 of the resin frame 5 and is to be fixed by a screw to this boss 54; a strip section 71 extending from an end portion of the top plate section 72 along the boss 54 to a position at the same level as the front surface of the resin frame 5; a seat plate section 74 projecting from an end portion of the strip section 71 and is to be in contact with the front surface of the resin frame 5; and a U-shaped spring plate section 75 projecting from the seat plate section 74. A circular hole 73 through which a screw is to pass is defined in the top plate section 72 of the grounding clamp 7.

The spring plate section 75 of the grounding clamp 7 is bent into a U-shape, extending from one edge to the opposite edge of the seat plate section 74. The U-shape defined by the spring plate section 75 is skewed to either side with respect to a normal to the seat plate section 74.

Figure 8:
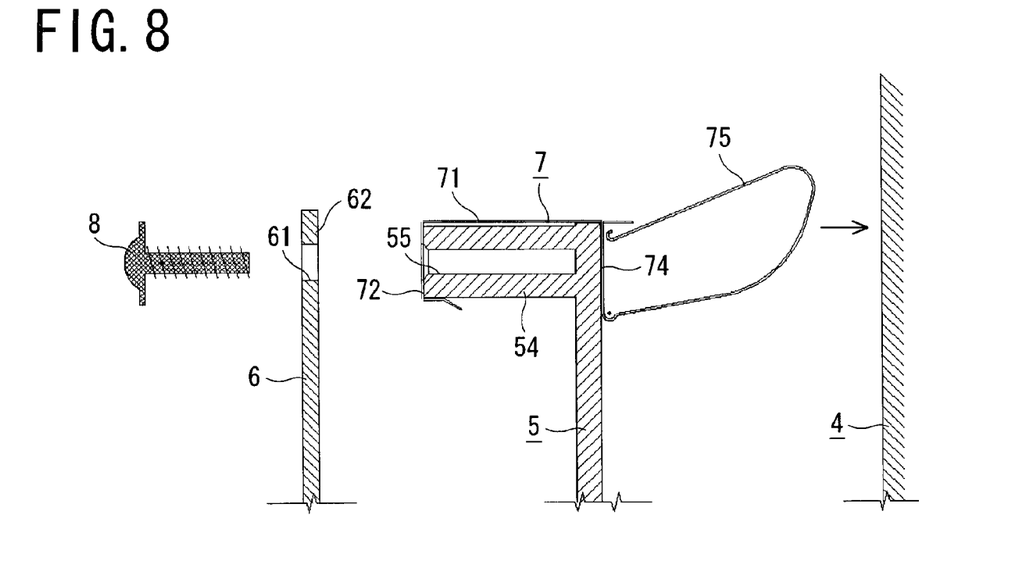
FIG. 8 is a sectional view showing a state where the circuit board and the resin frame are separated from each other.

As shown in FIG. 8, the top plate section 72 of the grounding clamp 7 is arranged on the surface of the boss 54 of the resin frame 5, and the seat plate section 74 of the grounding clamp 7 is arranged on the front surface of the resin frame 5. The resin frame 5 is thereby held under pressure between the top plate section 72 and the seat plate section 74 of the grounding clamp 7, by the pressure of which the grounding clamp 7 is attached to the resin frame 5.

The circuit board 6 is supported by the plurality of bosses 54 of the resin frame 5. Further, the screw 8 is inserted into the screw hole 61 of the circuit board 6 to pass through the circular hole 73 of the grounding clamp 7. Then, the screw portion of the screw 8 is threadedly engaged with an insertion hole 55 of the boss 54, thereby fixing the circuit board 6 to the resin frame 5. As a result, the top plate section 72 of the grounding clamp 7 is fixed at the same time to the boss 54.

In the assembly process of the liquid crystal display television receiver, the circuit board 6 and the grounding clamp 7 are fixed by using the screws 8 to the resin frame 5 as discussed above. Then, with the liquid crystal display panel 4 being arranged on the rear surface of the front cabinet 1 as shown in FIG. 2, the resin frame 5 is fixed by screws to the front cabinet 1.

Figure 9:
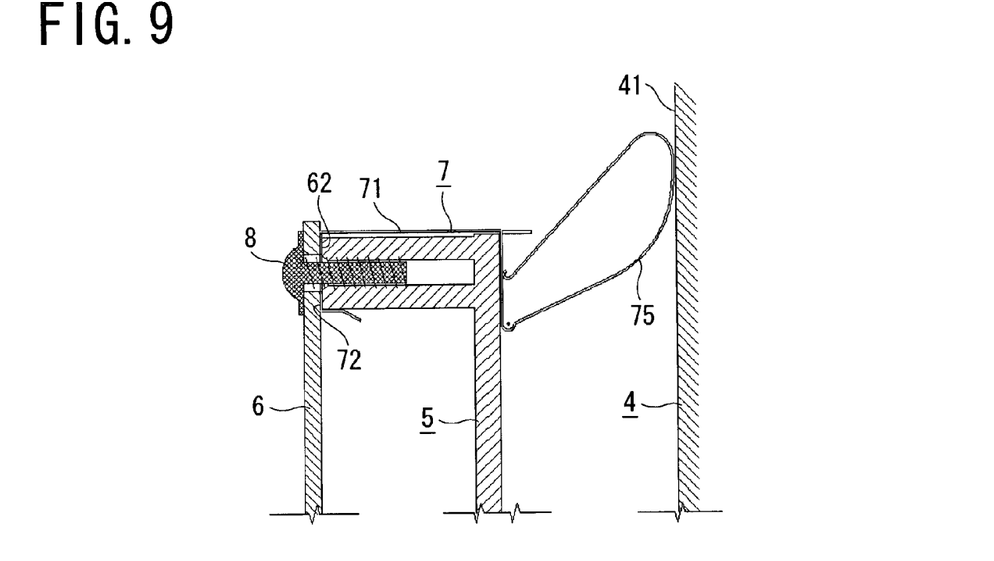
FIG. 9 is a sectional view showing a state where the circuit board and the liquid crystal display panel are electrically connected by the grounding clamp.

As a result, the spring plate section 75 of the grounding clamp 7 is pressed against the metal plate 41 of the liquid crystal display panel 4 as shown in FIG. 9. The spring plate section 75 is thereby elastically deformed, by the elastic resilience of which the spring plate section 75 comes into contact under pressure with a surface of the metal plate 41. The U-shape defined by the spring plate section 75 of the grounding clamp 7 is skewed to either side. Hence, in the process of pressing the spring plate section 75 against the metal plate 41, the spring plate section 75 is displaced in one direction (in the example of FIG. 9, in an upward direction) so that a contact area of the spring plate section 75 with the metal plate 41 slidingly moves along the surface of the metal plate 41.

Thus, even in the presence of some foreign matter fixed to the surface of the metal plate 41, the spring plate section 75 of the grounding clamp 7 is in direct contact with the surface of the metal plate 41 to reliably establish electrical connection of the grounding clamp 7 with the metal plate 41. This condition is maintained by the above-discussed elastic resilience. As a result, the ground pattern 62 on the circuit board 6 is connected through the grounding clamp 7 to the metal plate 41 of the liquid crystal display panel 4 to establish electrical connection between the ground pattern 62 and the metal plate 41. The circuit board 6 is thereby held at a ground potential, so that the EMC of the circuit board 6 is maintained.

As discussed above, in the liquid crystal display television receiver of the present invention, the resin frame 5 takes the place of a conventionally used metal frame to realize weight savings and reduction in manufacturing costs. Further, EMC is maintained at a sufficient level by a ground structure realized by the grounding clamp 7.

For the placement of the grounding clamp 7, a fastening structure defined by the bosses 54 and the screws 8 for supporting the circuit board 6 on the resin frame 5 is employed. This means no specific structure is required for the placement of the grounding clamp 7. The grounding clamp 7 can be attached to one or more bosses 54 arbitrarily selected from the plurality of bosses 54.

The structure of each part of the present invention is not limited to that shown in the preferred embodiment discussed above. Various modifications which an expert in the pertinent technical field can realize can be devised without departing from the scope of the spirit of the present invention. Further, the present invention can be implemented not only in liquid crystal display television receivers but also in various types of image display devices with a flat display panel.

The invention claimed is:

1. An image display device comprising:
a casing with a front cabinet and a back cabinet;
a flat display panel arranged inside the casing;
a circuit board provided with an electronic circuit mounted thereon that causes an image to be displayed on the flat display panel;
a grounding clamp which is a piece of sheet metal arranged between said circuit board and said flat display panel, establishing electrical connection between a ground pattern formed on the circuit board and a metal plate arranged on the rear surface of the flat display panel;
said grounding clamp having an elastic section projecting toward the rear surface of said flat display panel, the elastic section being pressed against the metal plate of said flat display panel by its elastic resilience without using screws;
a plurality of bosses protruding from the grounding clamp and adapted to stick out for the placement of said circuit board;
a plurality of screws extending through the circuit board and engaged with said plurality of bosses respectively;
said grounding clamp is attached to at least one of said plurality of bosses by at least one screw of said plurality of screws,
said grounding clamp being a sheet metal; and
said grounding clamp comprising a fixed portion to be fixed to said one boss by said one screw and a spring plate section serving as said elastic section.

2. An image display device comprising:
a casing with a front cabinet and a back cabinet;
a flat display panel;
a circuit board provided with an electronic circuit mounted thereon that causes an image to be displayed on the flat display panel;
the flat display panel and the circuit board being arranged inside the casing;
a gounding clamp arranged between said circuit board and said flat display panel, and establishing electrical connection between a ground pattern formed on the circuit board and a metal plate arranged on a rear surface of the flat display panel;
said grounding clamp having an elastic section projecting toward the rear surface of said flat display panel, the elastic section being pressed against the metal plate of said flat display panel by its elastic resilience;
a plurality of bosses protruding from the grounding clamp and adapted to stick out for the placement of said circuit board;
a plurality of screws extending through the circuit board and engaged with said plurality of bosses respectively;
said grounding claim being attached to at least one of said plurality of bosses by at least one screw of said plurality of screws,
said grounding clamp being a sheet metal; and
said grounding clamp comprising a fixed portion being in contact with the ground pattern of said circuit board and to be fixed to said one boss by said one screw, and a spring plate section serving as said elastic section.

3. An image display device comprising:
a casing with a front cabinet and a back cabinet;
a flat display panel;
a circuit board provided with an electronic circuit mounted thereon that causes an image to be displayed on the flat display panel;
the flat display panel and the circuit board being arranged inside the casing;
a grounding clamp arranged between said circuit board and said flat display panel and establishing electrical connection between a ground pattern formed on the circuit board and a metal plate arranged on the rear surface of the flat display panel;
said grounding clamp having an elastic section projecting toward the rear surface of said flat display panel, the elastic section being pressed against the metal plate of said flat display panel by its elastic resilience without using screws;
a plurality of bosses protruding from the grounding clamp and adapted to stick out for the placement of said circuit board;
a plurality of screws extending through the circuit board and engaged with said plurality of bosses respectively;
said grounding clamp being attached to at least one of said plurality of bosses by at least one screw of said plurality of screws;
said grounding clamp being a sheet metal; and
said grounding clamp comprising a fixed portion being in contact with the ground pattern of said circuit board and to be fixed to said one boss by said one screw, and a spring plate section serving said elastic section.

* * * * *